United States Patent [19]
Duston

[11] 3,924,252
[45] Dec. 2, 1975

[54] LASER SMOKE DETECTION

[75] Inventor: David Kenneth Duston, Schenectady, N.Y.

[73] Assignee: Espey Mfg. & Electronics Corporation, Saratoga Springs, N.Y.

[22] Filed: Aug. 29, 1974

[21] Appl. No.: 501,793

Related U.S. Application Data

[63] Continuation-in-part of Ser. No. 341,533, March 15, 1973, abandoned.

[52] U.S. Cl............................. 340/237 S; 356/207
[51] Int. Cl.²......................................... G08B 17/10
[58] Field of Search......... 340/237 S; 250/573, 574, 250/575, 576, 552; 331/DIG. 1; 356/206, 207

[56] References Cited
UNITED STATES PATENTS

| | | | |
|---|---|---|---|
| 3,406,289 | 10/1968 | Schleusener | 356/207 |
| 3,447,370 | 6/1969 | Tanzman | 73/170 |
| 3,566,385 | 2/1971 | Lawson | 340/237 S X |
| 3,683,352 | 8/1972 | West et al. | 340/237 S X |
| 3,711,210 | 1/1973 | Krukowski | 356/207 |
| 3,723,746 | 3/1973 | Lawson et al. | 250/574 |
| 3,788,742 | 1/1974 | Garbuny | 356/207 X |
| 3,820,901 | 6/1974 | Kreuzer | 356/206 X |

*Primary Examiner*—John W. Caldwell
*Assistant Examiner*—Daniel Myer
*Attorney, Agent, or Firm*—George B. Oujevolk

[57] ABSTRACT

A smoke detecting system for detecting smoke in a building having two opposing walls having an amplitude modulated laser beam transmitter, including means for directing the beam along a predetermined path. Mounting means are connected to the laser beam transmitted, for mounting the laser beam transmitter and directing means on one opposing wall of the building, to direct a laser beam transmitted thereby toward the opposing wall of the building. There is a retroreflector, including means for mounting the same on the other opposing wall of a building in the path of the laser beam thereby causing the laser beam to be returned upon itself to the transmitter. A detector responsive to forward and backward scattered light provides a signal having a level which is proportional to the quantity of scattered light caused by any formed aerosol in the laser beam path, including mounting means mounting the detector so as to be disposed to read scattered light in the laser beam. Logic means are coupled to the detector for measuring the signal from the detector and for differentiating the signal to determine a rate of change in the quantity of scattered light. An alarm system is coupled to the logic means which has alarm operating means responsive to a predetermined rate of change in the logic means to operate the alarm system.

6 Claims, 12 Drawing Figures

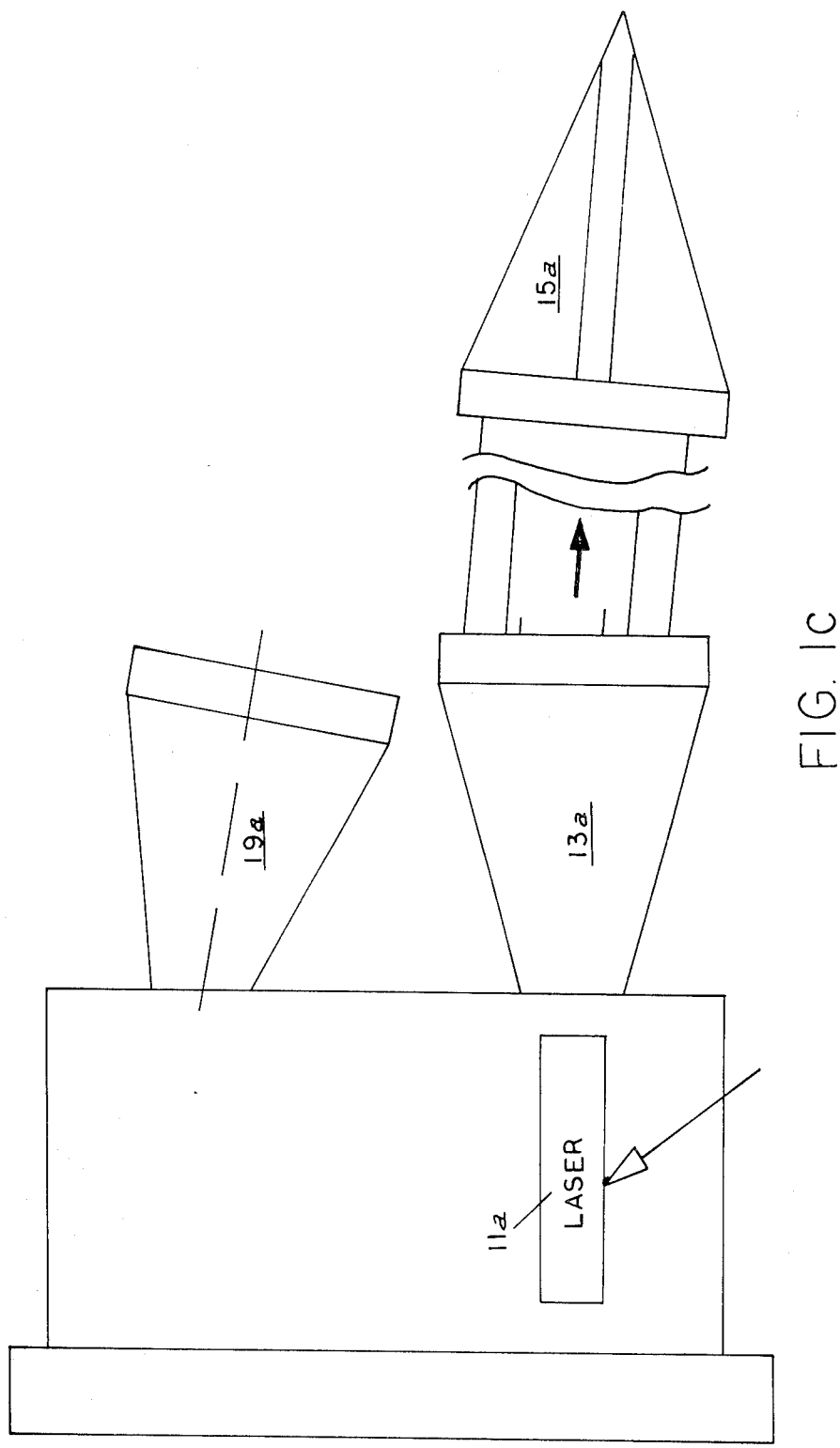

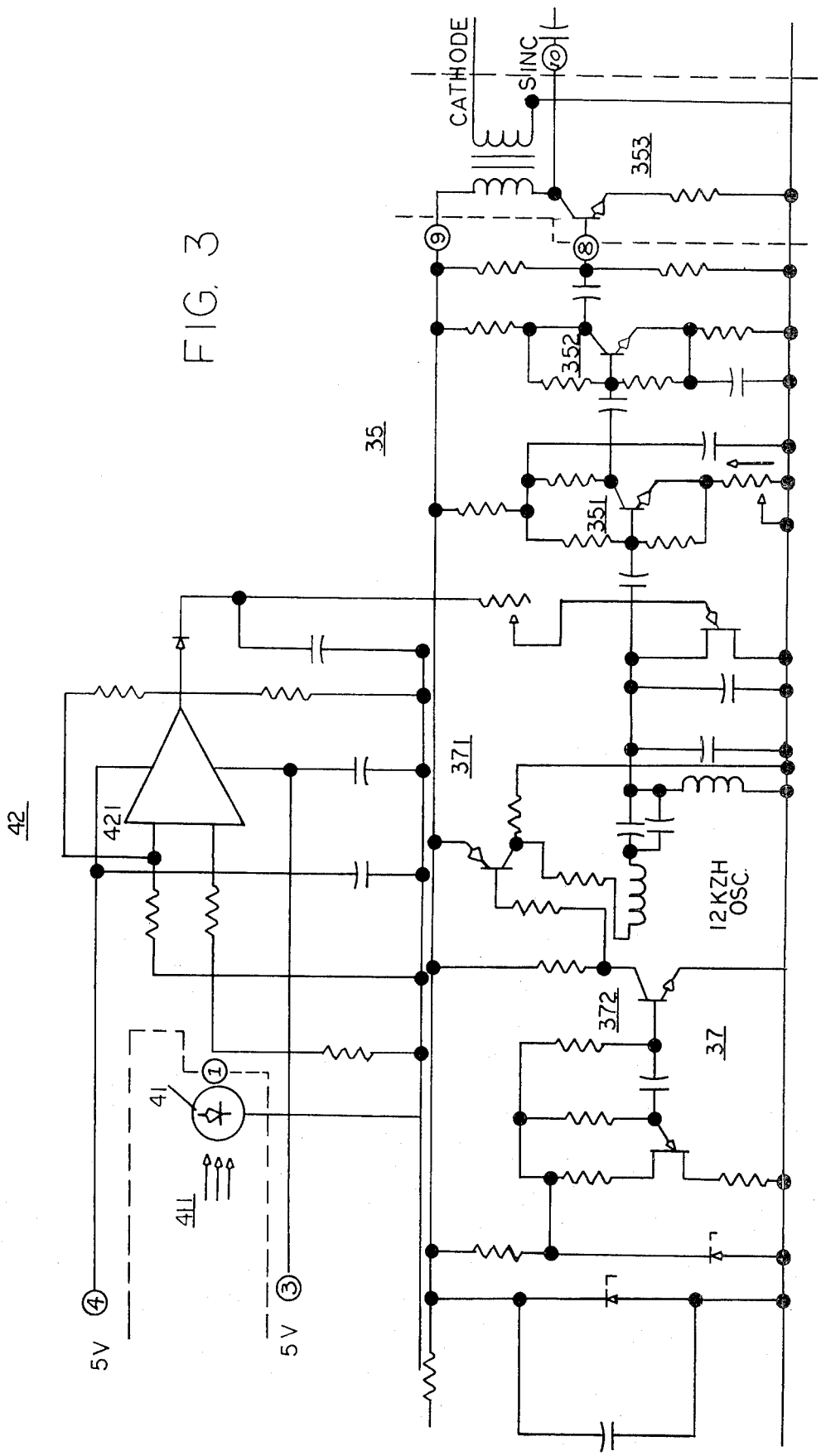

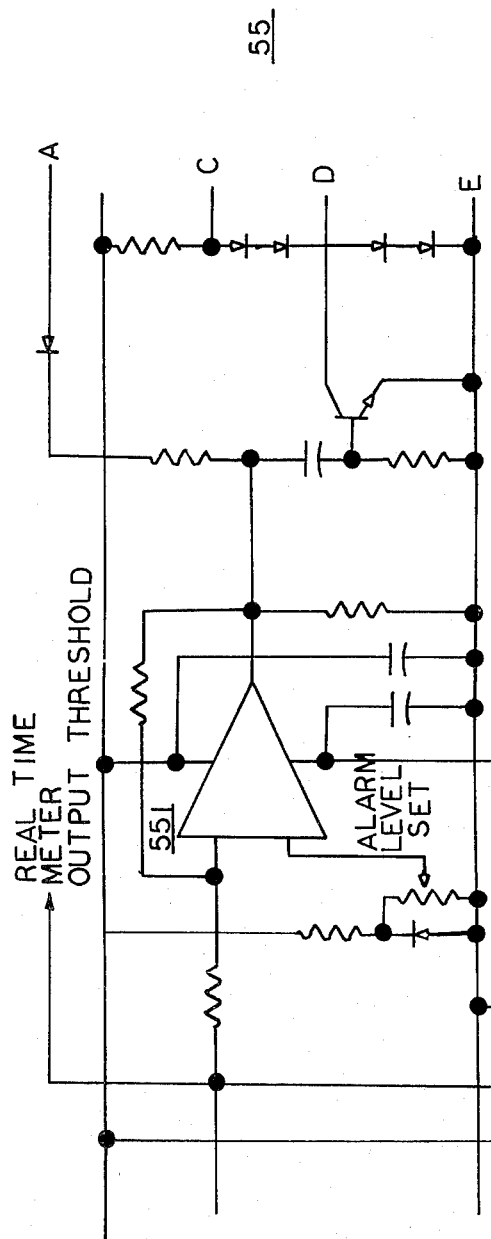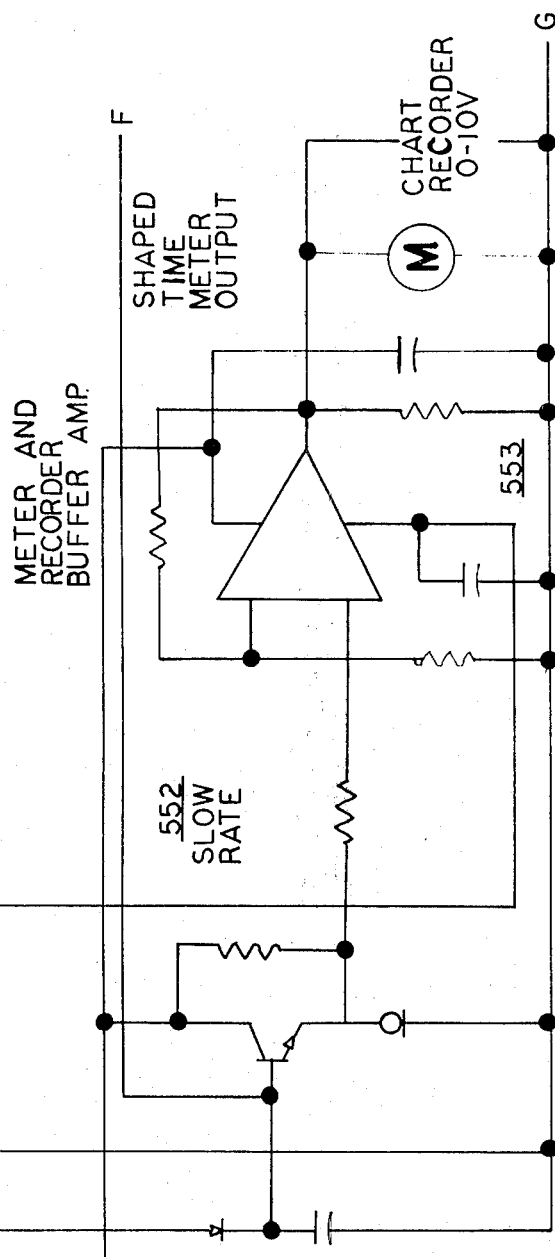
FIG. 5a

LASER SMOKE DETECTION

CROSS-REFERENCE TO RELATED APPLICATION

This is a continuation-in-part application of Ser. No. 341,533 filed Mar. 15, 1973, now abandoned.

BACKGROUND OF THE INVENTION

This invention relates to smoke detection and more particularly to the detection of smoke in an open building. The invention is especially applicable as an early warning fire detection and alarm system. The first observable fire hazard in a building is smoke from a smoldering fire. The early warning system of the invention is capable of detecting small quantities of smoke.

SUMMARY OF THE INVENTION

Briefly stated, according to the inventive concept, it is possible to detect the presence of smoke by the change in forward light scattering caused by an increasing amount of smoke. A laser system with a half milliwatt intensity is sufficient to cover a 500 foot path round trip. The system generally consists of three pieces of equipment. A laser transmitter telescope and detector in an electronic box at one end of the room, a corner cube reflector assembly at the other end of the room, and an optical detector separated approximately six inches from the transmitting telescope. Only one electronic box is used and the only wiring is 110 volts AC to the laser plus two wires to the alarm device. Response to first generated smoke occurs in periods between 5 and 20 seconds.

The invention, as well as other objects and advantages thereof will become more readily apparent from the following detailed description when taken together with the accompanying drawings, in which:

BRIEF DESCRIPTION OF THE DRAWINGS

FIG. 1c shows a side view of the apparatus shown in FIG. 1b.

FIG. 3 shows a schematic explanation of some of the components;

FIGS. 5a and 5b show a schematic explanation of some of the components; and,

DETAILED DESCRIPTION

Figure 1:
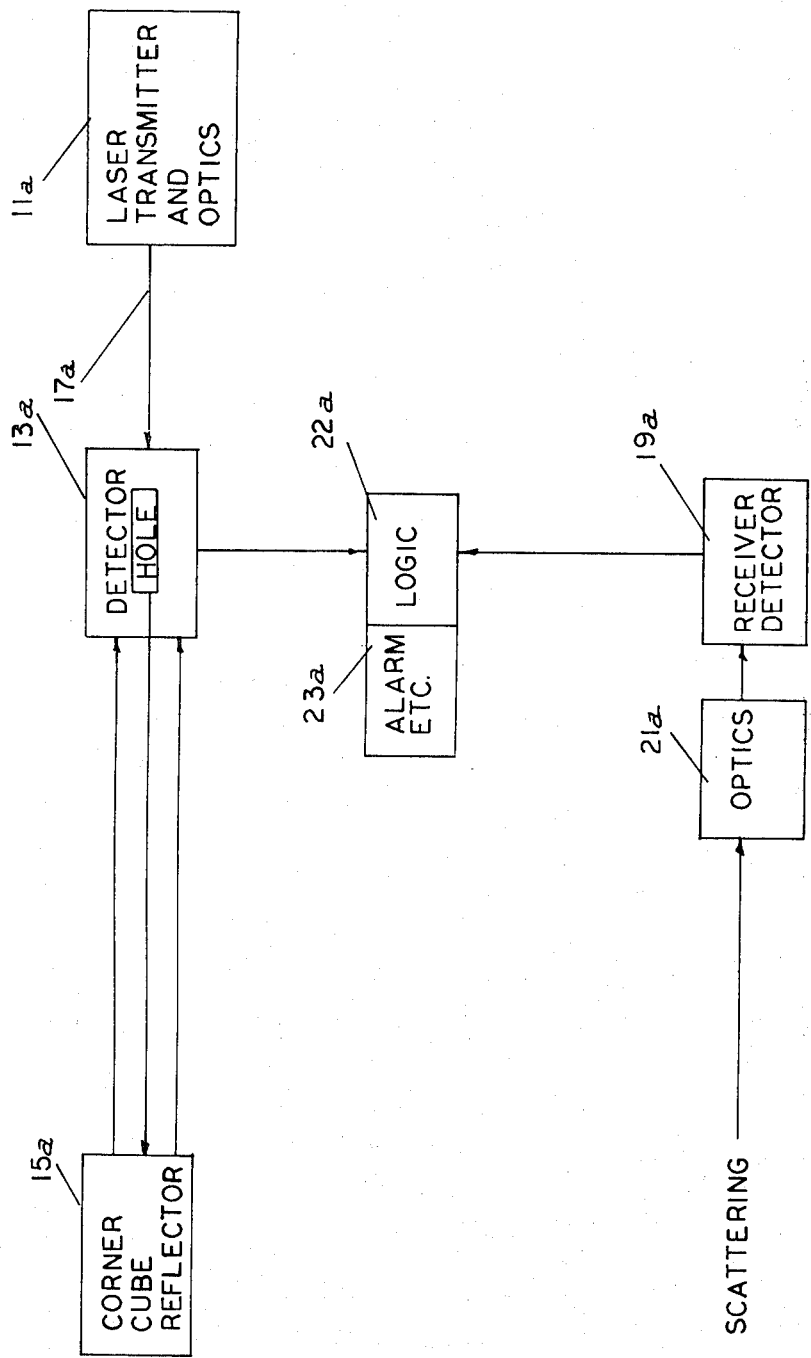
FIG. 1 is a block functional diagram showing how the invention operates.
Figure 1A:
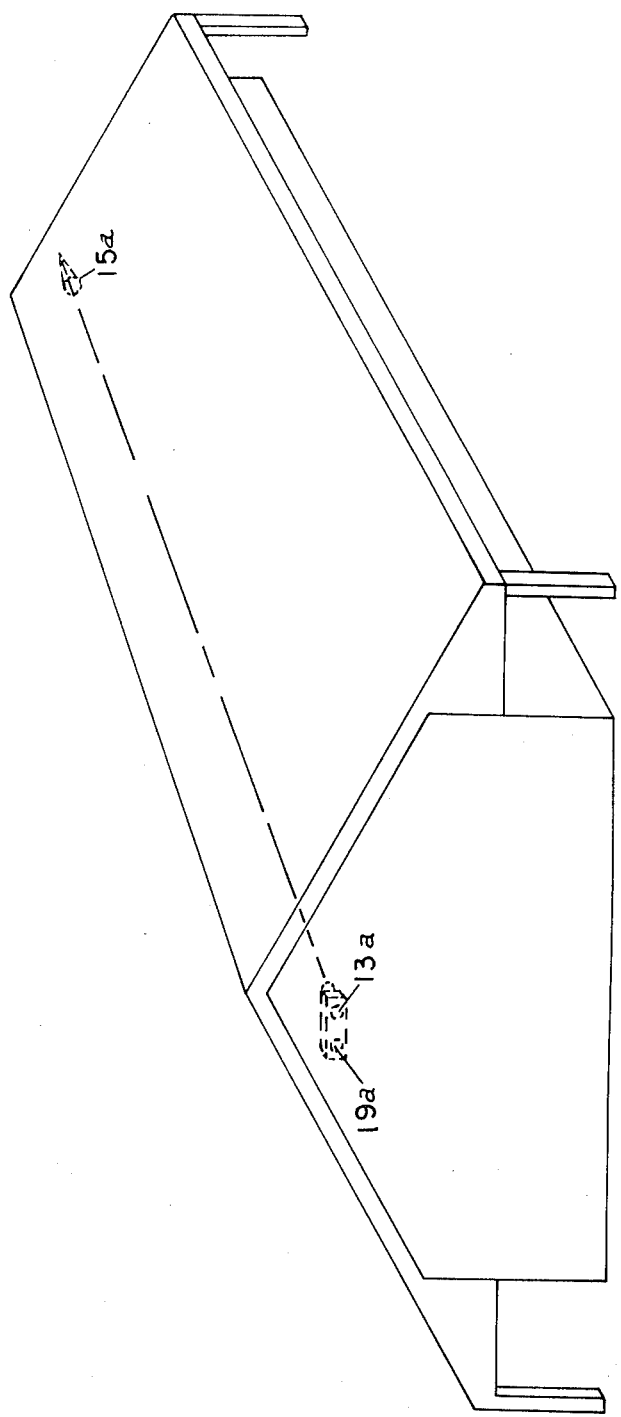
FIG. 1a is a perspective view of a building having the apparatus described herein.
Figure 1B:
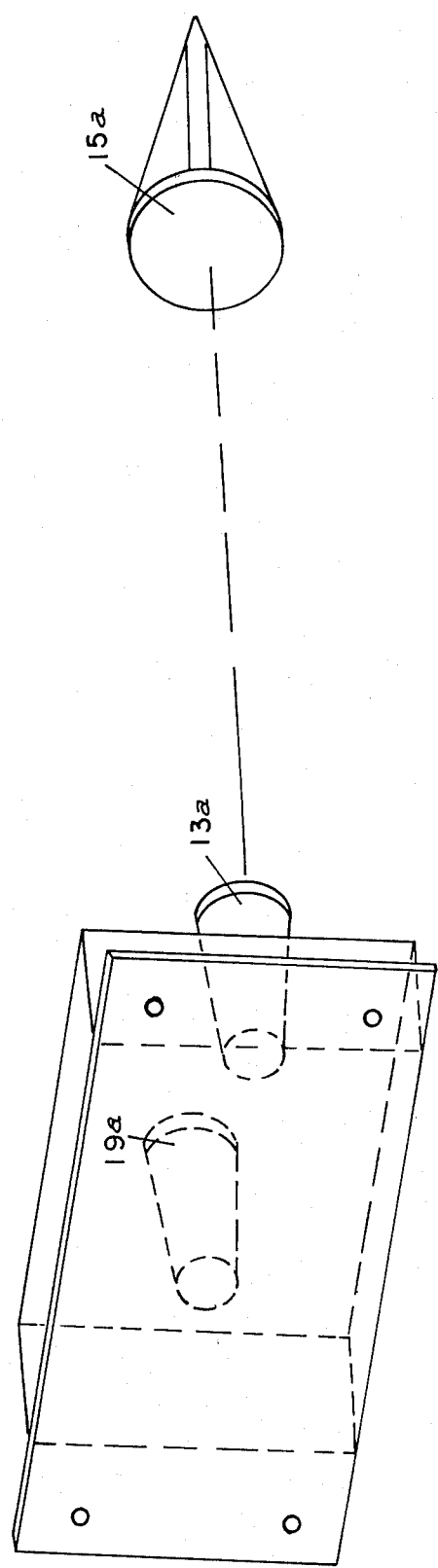
FIG. 1b is an enlarged perspective view of the outer boxes forming the apparatus.

The system components consist of a laser transmitter telescope 11a and an optical receiver 13a mounted in one end of the barn and a corner cube retroreflector 15b mounted in the opposite end. A red beam of laser light 17a, amplitude modulated at 15 KHz expanded approximately 20 times in diameter is transmitted the length of the barn. At the far end of a typical 210 foot barn, the beam diameter expands to approximately 2.0 inches in diameter. There, at the far end, the corner cube retro-reflector 15a returns the center 1 inch of the beam parallel to its incoming direction. The returned beam is monitored by the optical receiver 13a adjacent to the transmitter telescope 11a. The light scattered through small angles was monitored by the high gain optical receiver detector 19a which was focused by optics 21a on the light column from 10 feet to the far end of the barn. The two optical signals received, are both connected to sensing logic 22a, which, under appropriate conditions, can actuate the fire alarm 23a.

The heart of the transmitter is a half milliwatt helium neon laser which is amplitude modulated at 15KHz rate. The beam exiting from this laser is 1mm in diameter and would spread out in a cone angle of 1 milliradian. Since this angle would result in too large a beam working diameter, a 20 power beam expanding telescope is placed in the exiting beam, which reduces the divergence to 0.05 milliradians.

Figure 6A:
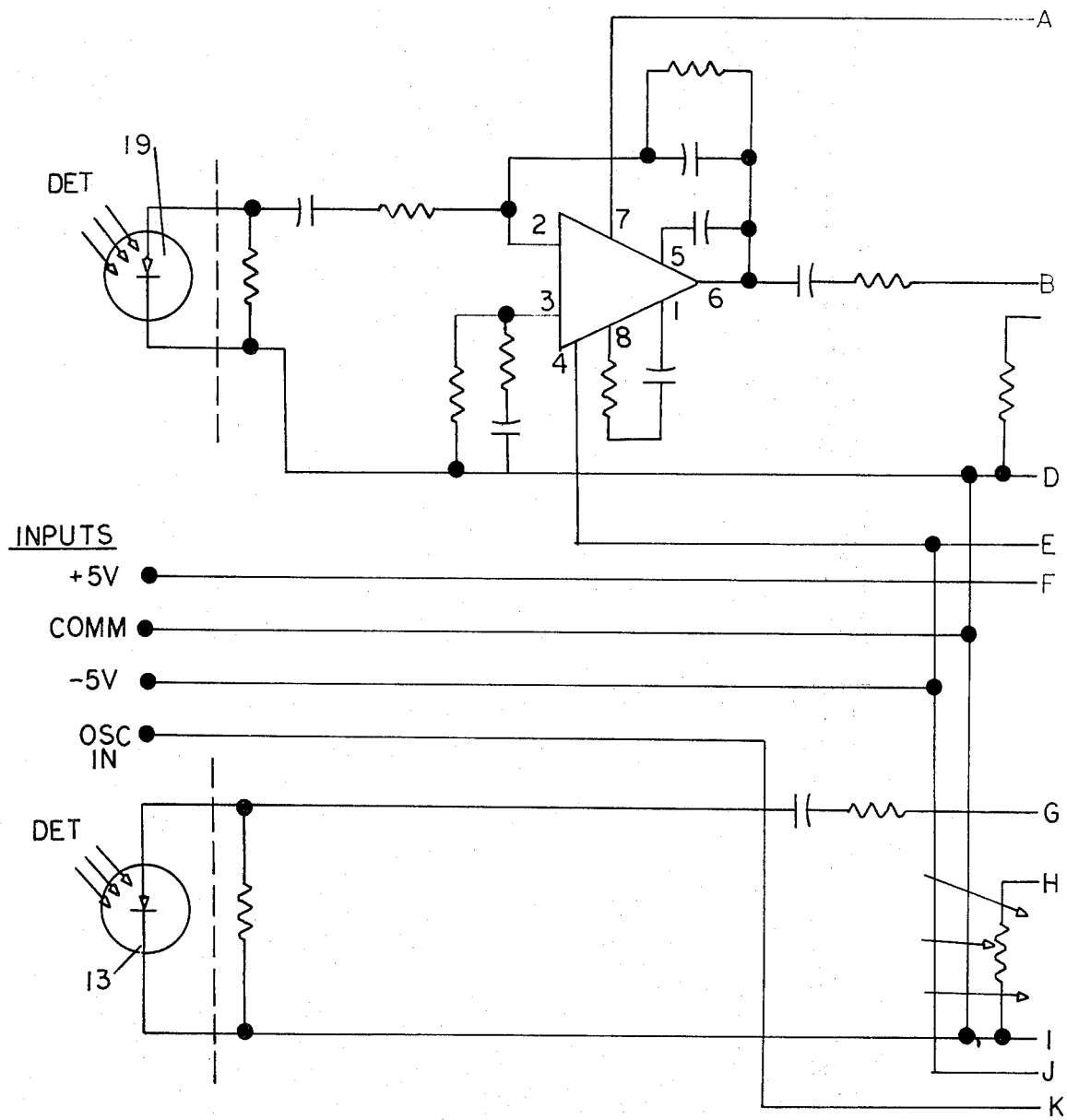
FIGS. 6a and 6b show a schematic explanation of some of the components.

The laser beam is returned from the far end of the barn by the corner-cube reflector 15. This device returns a light beam parallel to itself no matter what the angle of incidence. To operate this device in a dusty, dirty environment, the corner-cube reflector 15 had to be mounted in a metal shield 65, i.e., with a long metal tube as a shield. This shield 65 prevents dust from accumulating on the optical face of the cube, so as to not create an erroneous scattering of light. The reflected laser light 47 is received by a filter-silicon-detector 13 directly surrounding the transmitting telescope. This detector 13 (FIG. 6a) has a hole 43 and the outgoing beam passes through this hole. This detector signal is fed to a balanced synchronous demodulator 57 which is frequency tuned to accept the transmitted signal, i.e., the corner cube reflector will accept incoming laser beam 17 and reflect the reflected laser beam 47 back exactly in the direction from which it came. The reflected beam 47 propogates back to the telescope 45 and is focused on the beam detector 13. An alarm circuit then monitors the build-up of dust on the optics and sounds the maintenance alarm 61 if the beam is attenuated by dirty optics. This alarm circuit consists of a synchronous demodulator 57, an intensity monitor 59 and a maintenance alarm 61. If a person should stick his head suddenly in the beam, the alarm circuit will switch to a pulsing mode to eliminate eye hazards. If the beam is blotted out for a two minute period, the smoke alarm 63 coupled to the intensity monitor 59 will be activated as a back-up to the scattering detector 19. Thus, the instrument is a two channel device. There is a reference channel just described, and a smoke signal channel having a detector 19 located behind a light collecting lens system of receiver optics 21. The lens system provides an optical gain of approximately 1,000. The output of this module is fed to a two stage electronic amplifier and then a balanced synchronous demodulator 51.

The detector 19 (FIG. 6a) consists of a silicon photodiode mounted in a hermetically sealed can behind an integral narrow band interference filter that allows only helium neon laser radiation through to the detector.

Figure 2:
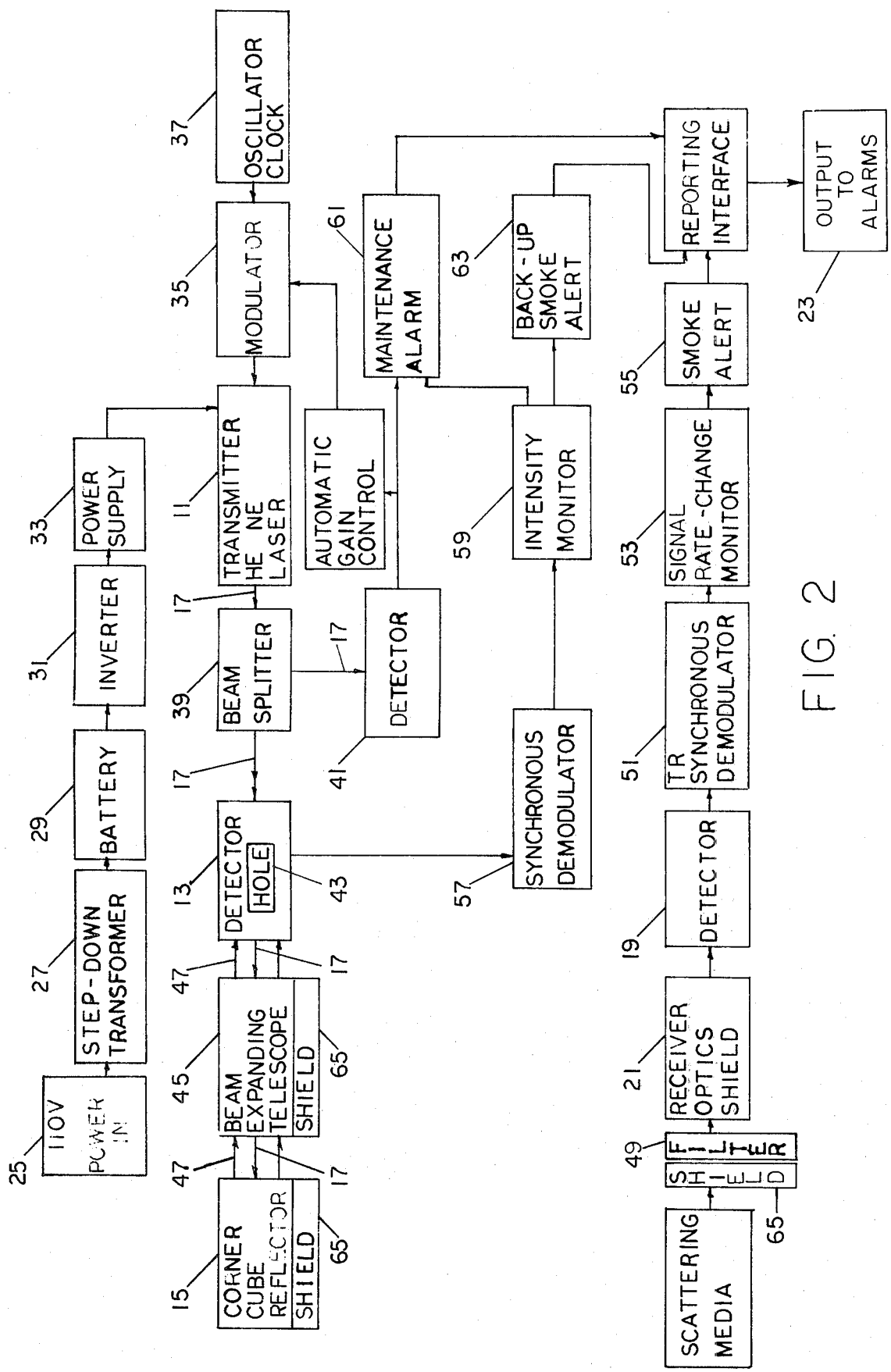
FIG. 2 is a more detailed block diagram providing the units which will provide the function described in FIG. 1.

The entire instrument is shown in block diagram in FIG. 2.

The top row of boxes contain the power conditioning equipment. The 110 V AC power main 25 continuously charges a 12 volt battery 29 across a transformer 27. The battery 29 provides 12V DC to the semiconductors and power to an inverter 31 to provide high voltage (2KV) power supply 33 to the laser modulator 35 (FIG. 3) comprising three NPN transistors 351, 352, 353 in parallel.

The next row of blocks reading right to left consist of an kHz oscillator 37 (FIG. 3) providing a sine wave to the laser modulator 35 (FIG. 3) by transistors 371 and 372. The modulator 35 modulates the output of the laser transmitter 11 to a 90% depth. The laser output has an AC component of at least one-half milliwatt. The beam output is sampled in a beam splitter 39 where 4% is fed back to a threshold detector 41 from a power maintenance alarm. The signal from the threshold detector 41 goes to an automatic gain control 42 where there is an amplifier 421. The output of the detector forms a DC level proportional to the AC laser and is fed to the modulator 35. The main beam 17 propogates through a beam detector 13 with a hole 43. The main beam 17 goes out through a beam expanding telescope 45 which expands a 1mm beam to a 20mm beam. The laser beam propogates the length of the structure being protected and hits a corner cube reflector 15. The function of the cube reflector 15 will be explained shortly.

The sensitive smoke detector is shown in the fifth row. The smoke particles scatter light out of the main laser column and into the received optics 21 at the other end of the room. The receiver detector 19 is filtered by a filter 49 to optically receive only the 6328 A radiation and is also filtered to the 15 KHz amplitude modulation. The next stage, i.e., the synchronous demodulator 51, synchronously detects only the in-phase component. This filtering is sufficient to make the detector insensitive to a 1000 watt light source when receiving a several nanowatt signal.

Figure 4A:
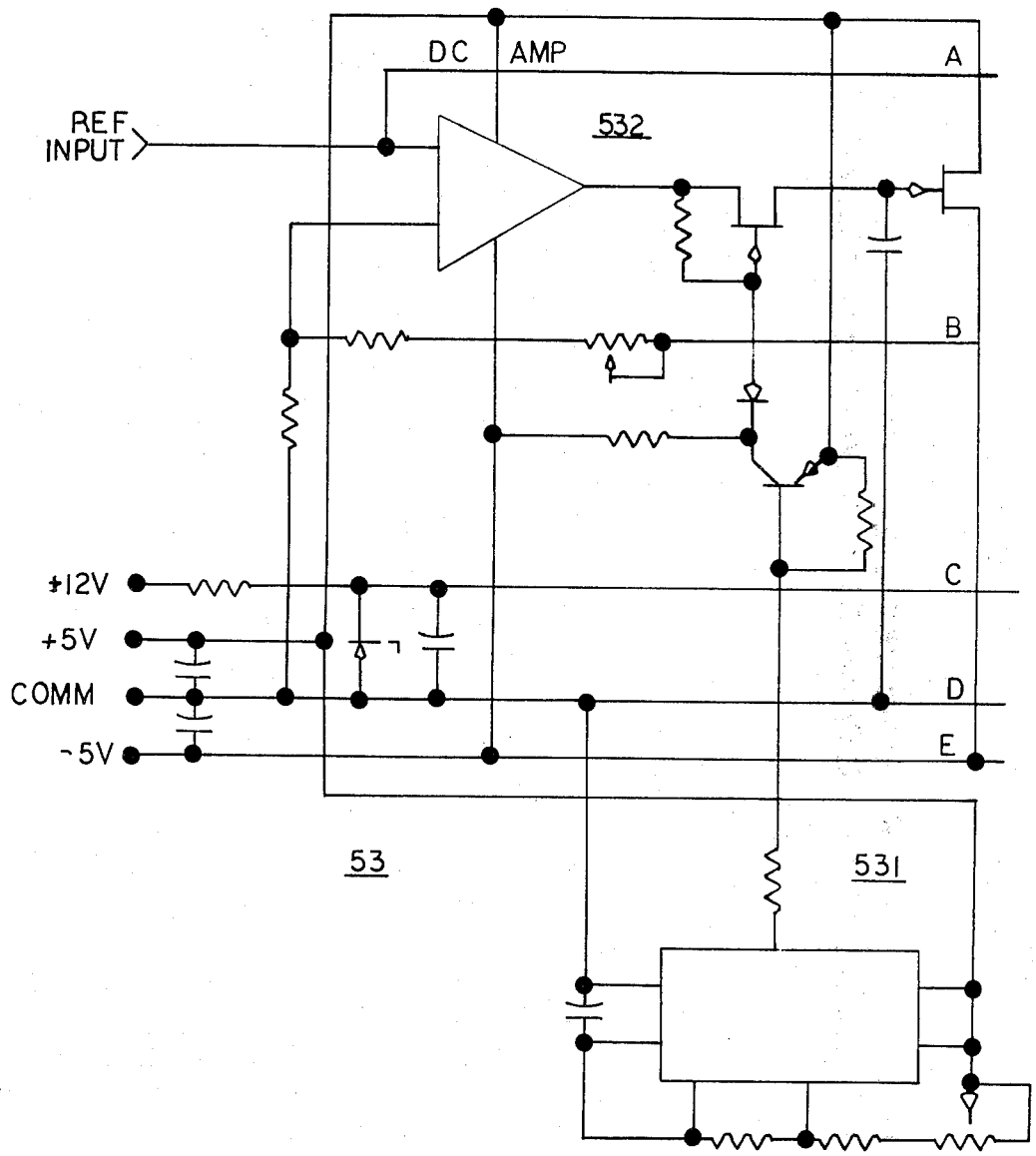
FIGS. 4a and 4b show a schematic explanation of some of the components.
Figure 4B:
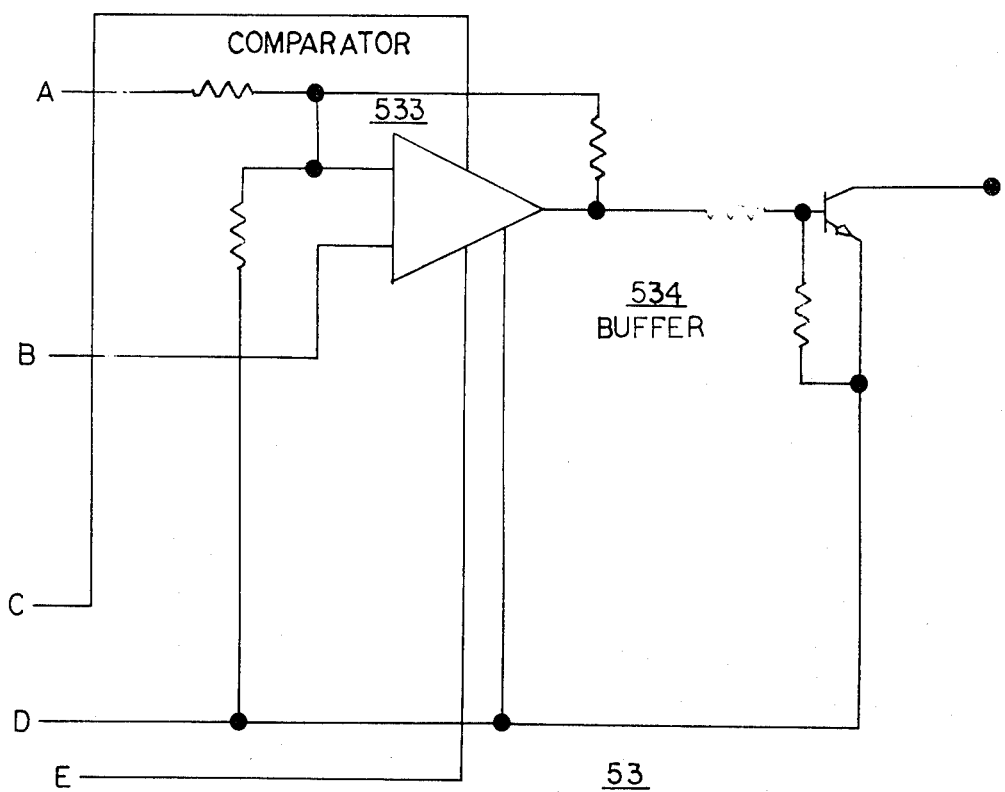
Figure 5B:
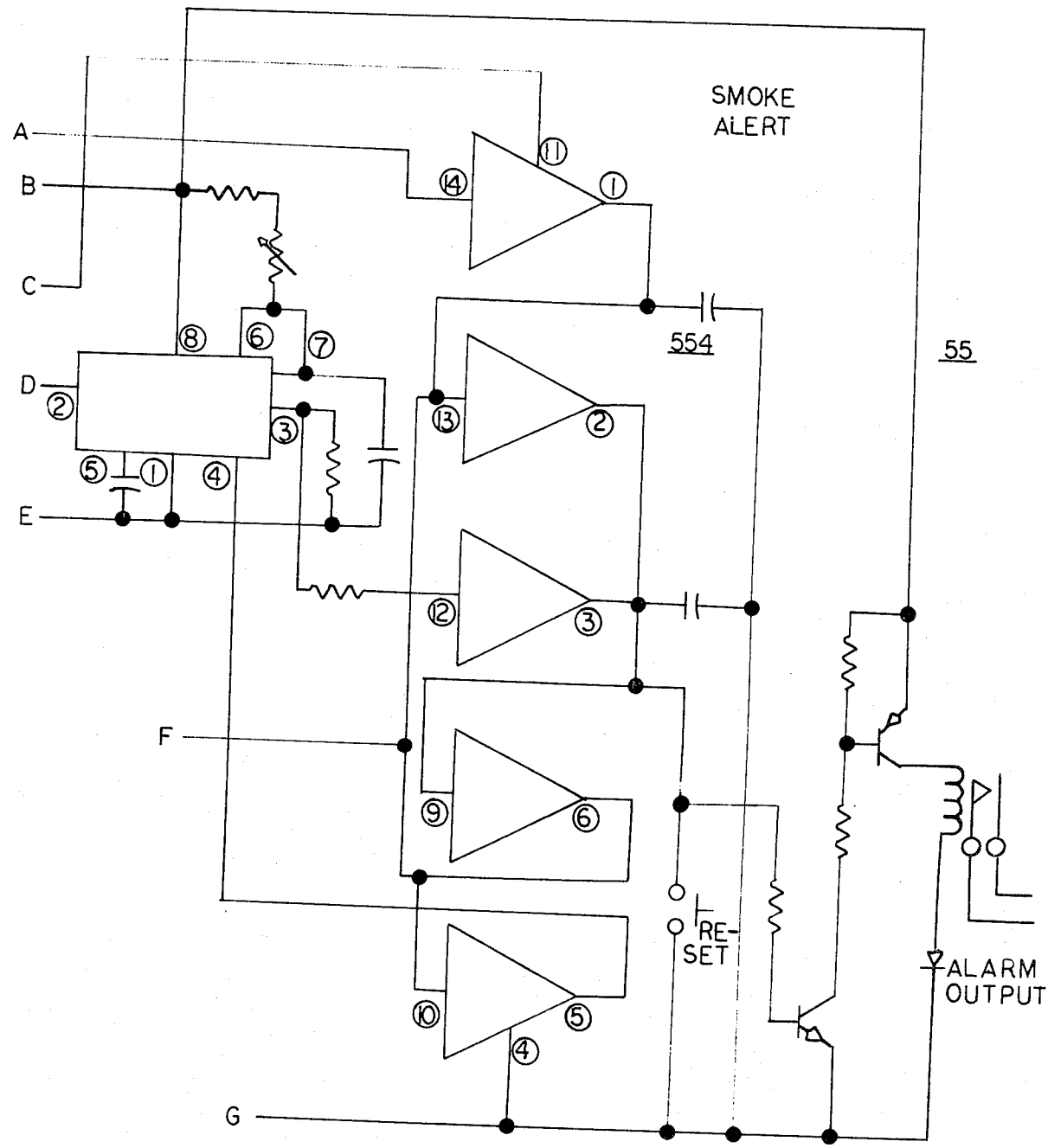

To detect the presence of smoke associated with a fire, a signal rate of change monitor 53 (FIG. 4a and 4b) is activated only if there is a sudden change in the scattered light intensity. The rate of change monitor compares a current signal with a previous sample to determine changes within a fixed material. It comprises a timer 531, a DC amplifier 532, a comparator 533 and a buffer amplifier 534. This circuit will not respond to very fast changes such as birds flying through the beam. It is set to respond to smoke build-ups in the 5 to 40 second time period. When the rate of change monitor 53 detects this rapid change in scattered light intensity, it trips the smoke alert 55 (FIGS. 5a and 5b) which is connected to the alarm 23. The smoke alert 55 (FIG. 5a and 5b) comprises a threshold detector 55 which thresholds on a D.C. level to allow for animals passing through the beam consisting of a transistor in parallel with a resistor 552, a meter, recorder and buffer amplifier 553 and a time delay and latching circuit 554 for the alarm. This circuit uses a hexinverter described in the Seymour Saslow U.S. Pat. No. 3,733,534.

The following components require particular mention:

The detector 13, with a hole 43 and detector 19 are silicon photo-diodes 131, 191 in parallel with a resistor 132, 192. In each there is a clear aperture 2mm in diameter through the center. The device is hermetically sealed in a can which provides electrical and mechanical mounting.

Detector 41 which is the threshold detector for the maintenance alarm is a pin photo-diode 411 mounted in a TO5 package. The diode 411 is coupled to an amplifier 412. The 12 KHz output of the detector forms a C.C. level proportional to the A.C. laser signal out of the laser.

Figure 6B:
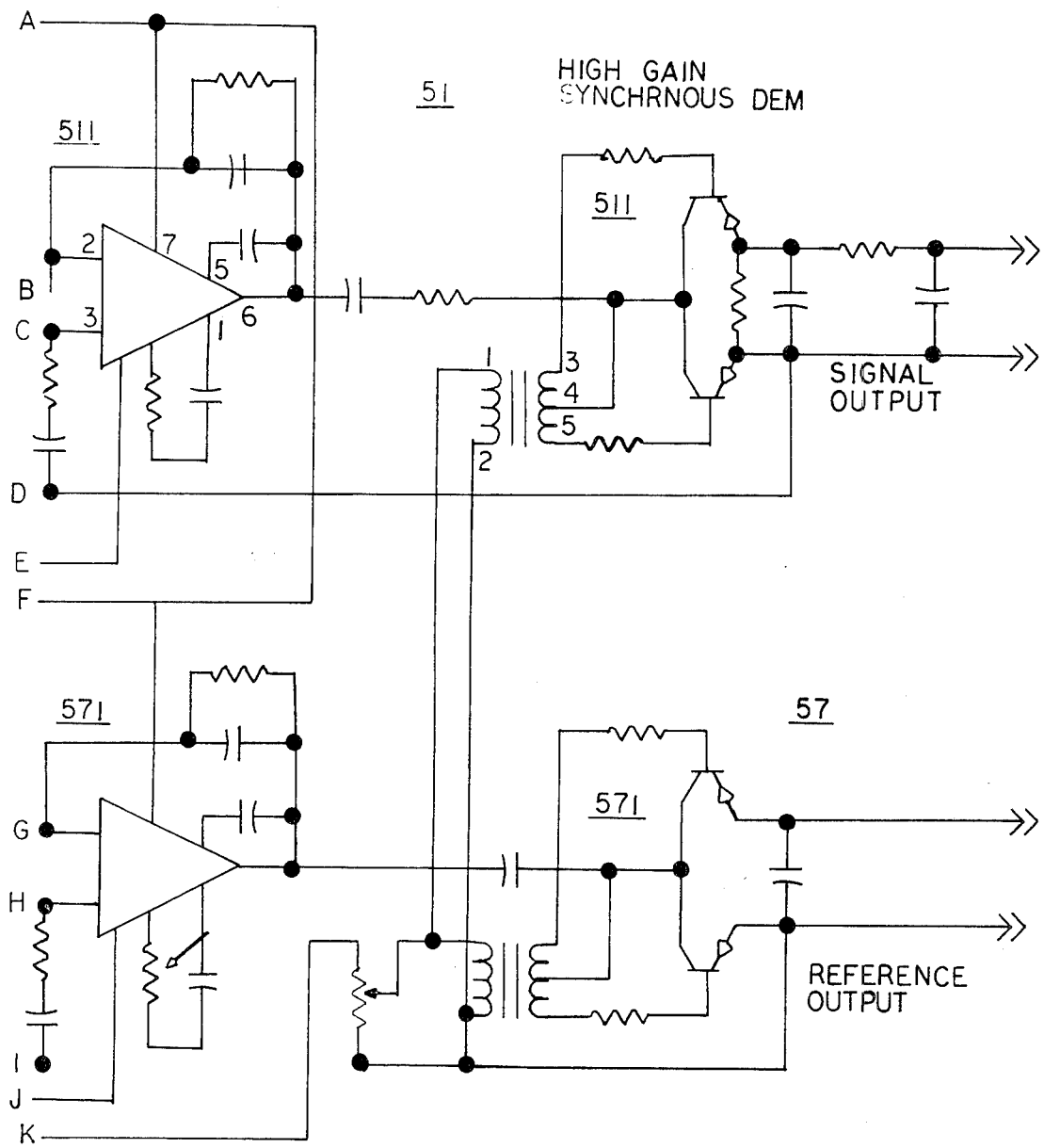

The synchronous demodulators 51 and 57 (FIGS. 6a, 6b) are a matched pair each of switching transistors 511 and 571 which are gated on and off by the transmitter clock gate rate of 12 KHz.

The intensity monitor 59, consists of a multistage operational amplifier. The rate of change monitor 53, a D.C. amplifier 531, consists of an operational amplifier followed by a differentiator which is followed by a level detector circuit.

The receiver optics 21 generally consist of a lens mounting body which holds a dust shield 15 to protect the front lens surface, a three element f2 20mm lens, a 6328 A narrow band spectral filter and an adaptor for the detector. This lens system provides the detector with a signal strength gain of more than 1000.

The power supply 33 comes in a hermetically sealed container and has 11 transformer 331 for connection to a power line.

It is to be observed therefor that two mechanisms allow the rapid sensing of increasing smoke concentration in a building:

1. In a dust filled building, the sensitive detector will read the forward scattered component of the dust scattering. Since this light is an integral over the light column in the entire building it is a smoothly varying function which changes slowly compared to the rate at which smoke builds up. When a fire starts, it will attenuate the light scattered by the dust and cause a negative slope of scattered light as a function of time.

2. In a structure that is dust free, a different scattering phenomena occurs. The scattering detector 19 typically receives no signal. When a fire occurs, the detector sees a rapidly increasing scattered light signal. This increase can equally well trigger the rate of change monitor 53. Eventually the smoke will be so dense that the scattered light signal, as well as the signal returning to detector 13 will decrease in signal strength.

The device is ideal for protecting large buildings which are essentially not enclosed in the areas directly near the roof peak. Since hot smoke rises to the highest point in the building, for greatest sensitivity, the device should be installed near the roof peak, or the highest point in the open building. The present invention therefor provides a device that has a. Ease of installation and its resultant low cost of installation.

b. Ease of maintenance, i.e., just two boxes per barn to inspect.

c. Long periods between maintenance. The unit is designed to operate six months without maintenance.

d. When a catastrophy occurs, the maintenance alarm signals the user.

I claim:

1. A smoke detecting system for detecting smoke in a building having two opposing walls comprising in combination:

a. an amplitude modulated laser beam transmitter including means for directing the beam along a predetermined path;

b. first mounting means connected to said laser beam transmitted for mounting said laser beam transmitter and directing means on one opposing wall of said building to direct a laser beam transmitted thereby toward the opposing wall of said building;

c. a retroreflector including means for mounting the same on the other opposing wall of said building in the path of said laser beam thereby causing said laser beam to be returned upon itself to the transmitter;

d. a detector responsive to forward and backward scattered light to provide a signal having a level which is proportional to the quantity of scattered light caused by any formed aerosol in the laser beam path, including second mounting means mounting the detector so as to be disposed to read scattered light in said laser beam;

e. logic means coupled to said detector for measuring the signal from the detector and for differentiating the signal to determine a rate of change in the quantity of scattered light;

f. an alarm system, coupled to said logic means; and g. alarm operating means responsive to a predetermined rate of change in said logic means to operate said alarm system.

2. The system as claimed in claim 1 with the addition of a device for determining if the transmitted laser beam is being redirected along itself by said retroreflector, comprising:

a. a beam splitter mounted in the path of the laser beam;

b. a second detector including circuitry responsive to a directly returned laser beam having mounting means for mounting said second detector in the intended path of the returned laser beam, said second detector in the intended path of the returned laser beam, said second detector circuitry emitting a signal proportional to the amount of beam returned;

c. an alarm and switching device coupled to said second detector circuitry including a threshold circuit activated when the level of signal from the return beam detector falls below a predetermined value.

3. A smoke system for detecting smoke in a building having opposing walls comprising in combination:

a. laser beam transmitter (11a) including means for mounting the same at one wall of the building;

b. retro-reflector (15a) including means for mounting the same at the other wall of the building;

c. detector means (19a) including light collecting and focusing means for reading light scattered by particles passing through said reflected laser beam;

d. logic means (22a) coupled to said detector means and responsive to a change in level of said scattered light to indicating an atmospheric change (smoke); and, e. alarm means coupled to said logic means to be activated thereby in response to the detection of change in level of said scattered light.

4. An alarm system responsive to reflected light comprising in combination:

a. an amplitude modulated laser beam transmitter (11a) including means for mounting the same at one wall of a building having two opposing walls;

b. a detector (19a) including light collecting and focusing means for reading light scattered by particles passing through said laser beam including mounting means for mounting the detector on the opposing wall;

c. logic means (22a) coupled to said detector and responsive to a change in level; and, d. alarm means coupled to said logic means to be activated thereby in response to the detector signal.

5. A smoke detecting system for detecting smoke in a building having two opposing walls comprising in combination:

a. an amplitude modulated laser beam transmitter including directing means for directing the beam along a predetermined path;

b. first mounting means for mounting said laser beam transmitter and directing means on one wall of said building to direct a laser beam transmitted thereby toward the opposing wall of said building;

c. a detector including signal giving means responsive to forward and backward scattered light to provide a signal having a level which is proportional to the quantity of scattered light caused by an aerosol in the laser beam; including second mounting means for mounting the detector on the wall opposing the transmitter to detect the forward scattered laser beam and the direct laser beam;

d. logic means coupled to the detector for measuring the signal from the detector and differentiating the signal to determine a rate of change in the quantity of scattered light;

e. an alarm system coupled to the logic means; and, f. alarm operating means responsive to a predetermined rate of change in said logic means to operate said alarm system.

6. The system of claim 1 wherein the said detector includes circuit means for analyzing and gating the detected signal to filter extraneous signals so that the signal emitted by the detector is responsive only to the scattered light caused by the frequency phase and amplitude modulation of the laser beam.

* * * * *